United States Patent [19]

Kudo

[11] Patent Number: 5,121,422
[45] Date of Patent: Jun. 9, 1992

[54] VOICE MESSAGE STORAGE DEVICE INCLUDING AT LEAST TWO ANALOG RECORDING MEDIUMS

[75] Inventor: Hitoshi Kudo, Fukuoka, Japan

[73] Assignee: Matsushita Electric Industrial Co., Ltd., Osaka, Japan

[21] Appl. No.: 513,944

[22] Filed: Apr. 24, 1990

[30] Foreign Application Priority Data

Apr. 24, 1989 [JP] Japan ................................ 1-103880

[51] Int. Cl.[5] ......................................... H04M 1/65
[52] U.S. Cl. ...................................... 379/73; 379/67; 379/77
[58] Field of Search ................ 379/88, 73, 77, 76, 379/67

[56] References Cited

U.S. PATENT DOCUMENTS

| 4,320,256 | 3/1982 | Freeman | 379/73 |
|---|---|---|---|
| 4,518,827 | 5/1985 | Sagara | 379/88 |
| 4,571,458 | 2/1986 | Bond | 379/77 |
| 4,588,857 | 5/1986 | Arsem | 379/76 |
| 4,591,664 | 5/1986 | Freeman | 379/73 |
| 4,594,476 | 6/1986 | Freeman | 379/76 |
| 4,782,510 | 11/1988 | Szlam | 379/88 |
| 4,817,127 | 3/1989 | Chamberlin et al. | 379/67 |
| 4,847,889 | 7/1989 | Eswaran | 379/67 |
| 4,850,005 | 7/1989 | Hashimoto | 379/51 |
| 4,853,952 | 8/1989 | Jachmann et al. | 379/88 |
| 4,860,339 | 8/1989 | D'Agosto, III et al. | 379/67 |
| 4,951,307 | 8/1990 | Willard | 379/74 |

FOREIGN PATENT DOCUMENTS

| 0039756 | 2/1986 | Japan | 379/76 |
|---|---|---|---|
| 0230145 | 10/1987 | Japan | 379/88 |
| 0046045 | 2/1988 | Japan | 379/88 |
| 0143456 | 6/1989 | Japan | 379/88 |
| 0648972 | 4/1985 | Switzerland | 379/76 |
| 2188812 | 10/1987 | United Kingdom | 379/88 |

OTHER PUBLICATIONS

"Service Manual KX-T380810", p. 19 (date and publisher omitted).

Primary Examiner—Thomas W. Brown
Attorney, Agent, or Firm—Wenderoth, Lind & Ponack

[57] ABSTRACT

A voice message storage device receives, stores and plays back voice messages transmitted on a telephone line. The device includes a first analog recording tape unit associated with a first identification signal and a first password, and a second analog recording tape unit associated with a second identification and a second password. An identification signal detecting unit is provided for detecting dial pulses or DTMF signals, denoting the identification signal and password for accessing the first or second analog recording tape unit.

17 Claims, 5 Drawing Sheets

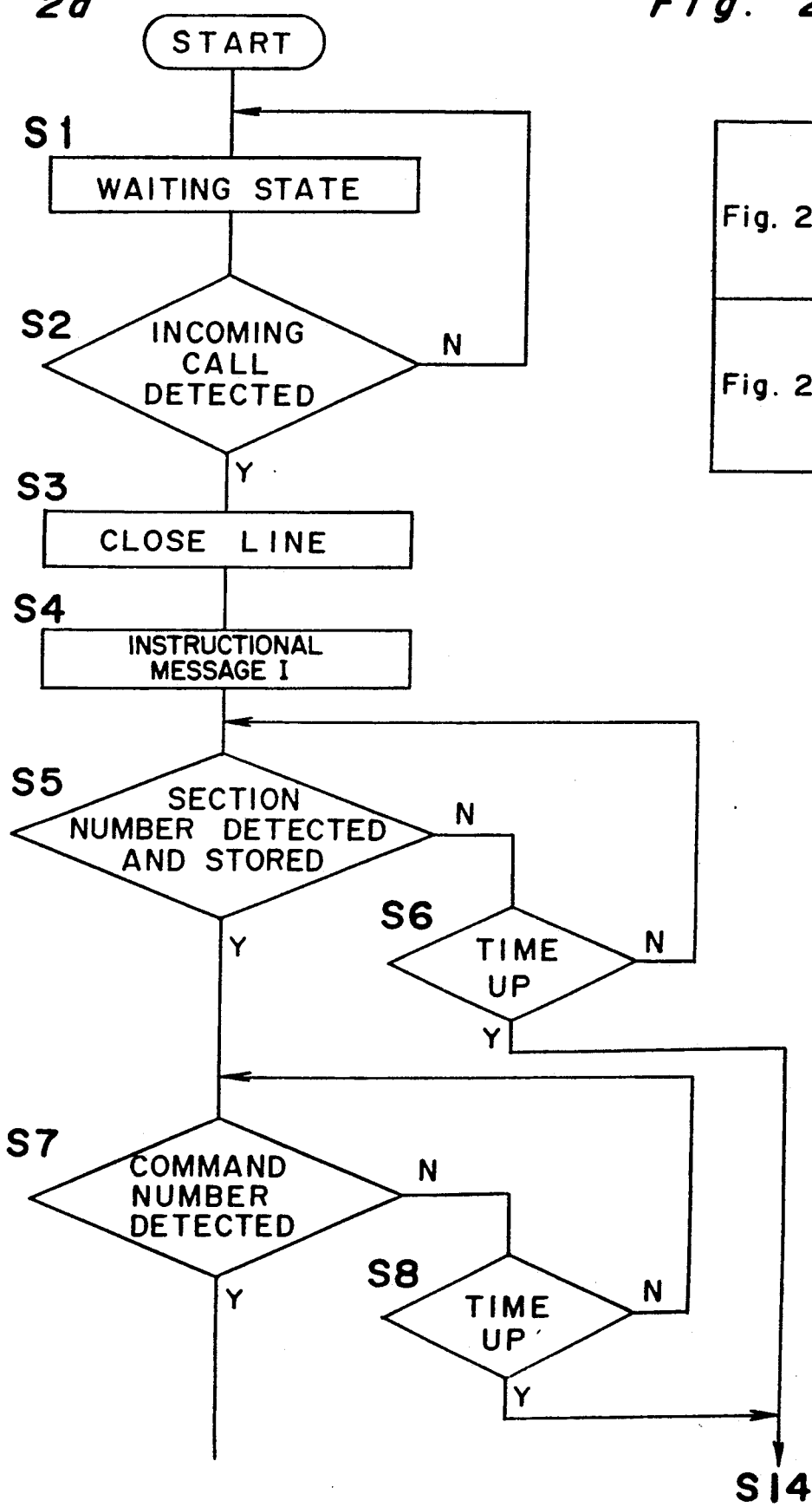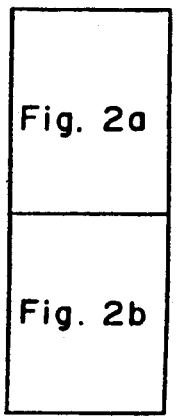

VOICE MESSAGE STORAGE DEVICE INCLUDING AT LEAST TWO ANALOG RECORDING MEDIUMS

BACKGROUND OF THE INVENTION

1. Field of the Invention

The present invention relates to an analog voice message storage device for storing voice messages transmitted on a telephone line, and more particularly, to an analog voice message storage device equipped in a telephone for recroding and reproducing messages transmitted on a telephone line.

2. Description of the Prior Art

One example of the voice message storage device is a telephone associated with a known automatic answering system utilizing an analog telephone line. Such an answering system is increasingly in demand as the demand for information storage expands.

The following description is directed to a telephone answering system, as an example of an apparatus incorporating the voice message storage device, utilizing analog telephone line.

A conventional telephone answering system adapted to automatically answer in one's absence is shown in FIG. 3.

In FIG. 3, a detecting unit 2 connected to an analog telephone line 1 detects an incoming call signal. The line 1 is opened or closed by the operation of a line connecting unit 3. An audio signal message received on line 1 is recorded and reproduced by a message recording/reproducing unit 4, and outputted from a voice generating unit 5. An instructional message reproducing unit 6 reproduces audio signals denoting various instructional messages which are stored previously. The line connecting unit 3, message recording/reproducing unit 4 and instructional message reproducing unit 6 are controlled by a control unit 8. The message recording/reproducing unit 4 and instructional message reproducing unit 6 can be operated either by the manual operation of an operating unit 7 or by the a signal detected from the detecting unit 2. Each of the component units 2 through 8 is accommodated in a main body 9 associated with the telephone set.

The above telephone answering system operates in the following manner.

When the detecting unit 2 receives an incoming call, a detecting signal is supplied to control unit 8 which the performs the following controlling operation. First, the line 1 is closed by the connecting unit 3 to connect the line 1 to the instructional message reproducing unit 6. Thus, the instructional message reproducing unit 6 is operated to reproduce the audio signals of the stored instructional message on the line 1. As a result, the caller is permitted to hear various instructional messages which are stored previously. For example, a stored instructional message may be such as, "This is Mr. Smith speaking. I an sorry, but I'm out on business. So, would you please leave a message."

Thereafter, the line 1 is connected to the message recording/reproducing unit 4 to initiate automatic recording of the message of the caller. After a predetermined recording time, the message recording/reproducing unit 4 ceases recording. Then, the line 1 is opened again by the line connecting unit 3 to place the telephone in an on-hook condition.

When the owner of the telephone manipulates the operating unit 7, the recording/reproducing unit 4 is played back to enable the owner to listen to recorded the message through the voice generator 5.

In the above-described conventional voice message storage device equipped in the telephone, the message can be stored only for one person or for one group of people. If a number of people should share the use of the telephone, it is very difficult to maintain the privacy of the recorded message.

SUMMARY OF THE INVENTION

Accordingly, the present invention has been developed with a view to substantially solving the abovedescribed disadvantage inherent in the conventional voice message storage device, and has for its essential object to provide an improved voice message storage device.

According to the present invention, a voice message storage device is provided for storing voice messages transmitted on a telephone line. The device includes a line connecting unit for closing and opening the communication path of the telephone line, a first message recording/reproducing unit which is allotted with a first section identification signal and connected to the line connecting unit, and a second message recording-/reproducing unit which is allotted with a second section identification signal and connected to the line connecting unit. A section number detecting unit is also provided for detecting a section identification signal transmitted on the telephone line. Further, a control unit is provided, which is connected to the line connecting unit, for connecting the line connecting unit to the first message recording/reproducing unit when the section number detecting unit detects the first section identification signal to enable storing of a voice message in the first message recording/reproducing unit transmitted through the telephone line, and for connecting the line connecting unit to the second message recording/reproducing unit when the section number detecting unit detects the second section identification signal to enable storing of a voice message in the second message recording/reproducing unit transmitted through the telephone line.

The voice message storage device of the present invention achieves an individual separate utilization of one answering device by more than one person or groups of persons.

BRIEF DESCRIPTION OF THE DRAWINGS

These and other objects and features of the present invention will become clear from the following description taken in conjunction with the preferred embodiments thereof, with reference to the accompanying drawings throughout in which like parts are designated by like reference numerals, and in which:

FIGS. 1b, 1c and 1d are diagrams showing different modifications of the dialed signal detecting unit of FIG. 1a;

FIGS. 2a and 2b, taken together as shown in FIG. 2, are a flow chart indicating the operation of the voice message storage device of FIG. 1a.

DESCRIPTION OF THE PREFERRED EMBODIMENT

Figure 1A:
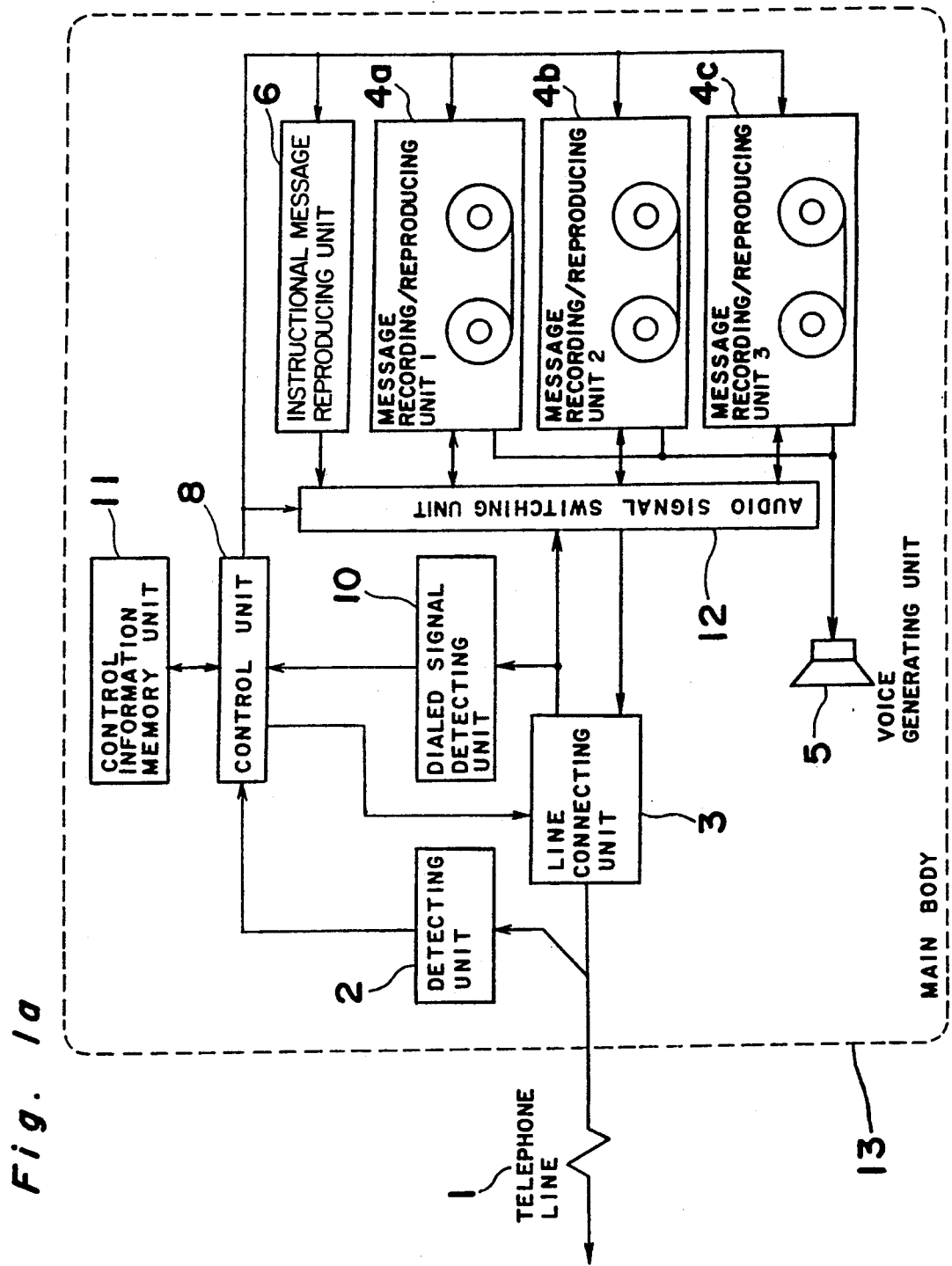
FIGS. 1a is a block diagram of a voice message storage device according to a preferred embodiment of the present invention.

Referring to FIG. 1a, a voice message storage device according to a preferred embodiment of the present invention will be described.

The voice message storage device shown in FIG. 1a includes a call signal detecting unit 2, connected to an analog telephone line 1, for detecting an incoming call signal. The line 1 is opened or closed by the operation of a line connecting unit 3. The voice message storage device further includes a dialed signal detecting unit 10 and an audio signal switching unit 12 connected to the line connecting unit 3. The audio signal switching unit 12 is connected to an instructional message reproducing unit 6 and also to three message recording/reproducing unit 4a, 4b and 4c, each of which can be formed by a cassette deck. According to the present embodiment, the instructional message reproducing unit 6 is previously stored with three instructional messages I, II and III, the details of which will be explained below in connection with FIGS. 2a and 2b. A control unit 8 is provided for receiving a signal from the call signal detecting unit 2 and also from the dialed signal detecting unit 10, and for providing control signals to line connecting unit 3, audio signal switching unit 12, instructional message reproducing unit 6 and three message recording/reproducing units 4a, 4b and 4c. A control information memory unit 11 is connected to control unit 8.

Each of the units 2, 3, 4a, 4b, 4c, 6, 8, 10 and 11 is accommodated in a main body 13 associated with a telephone set.

Figure 2B:
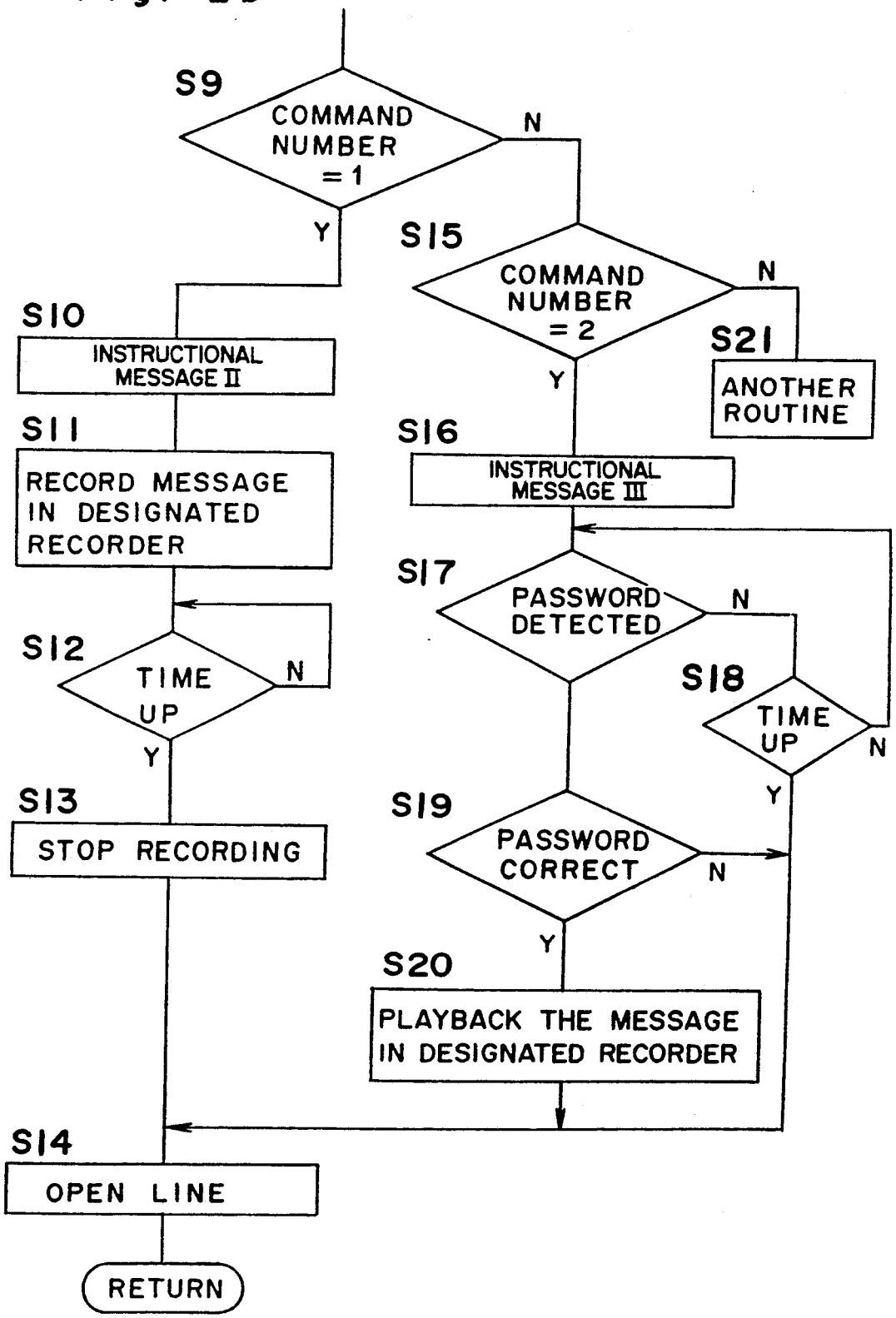
Figure 3:
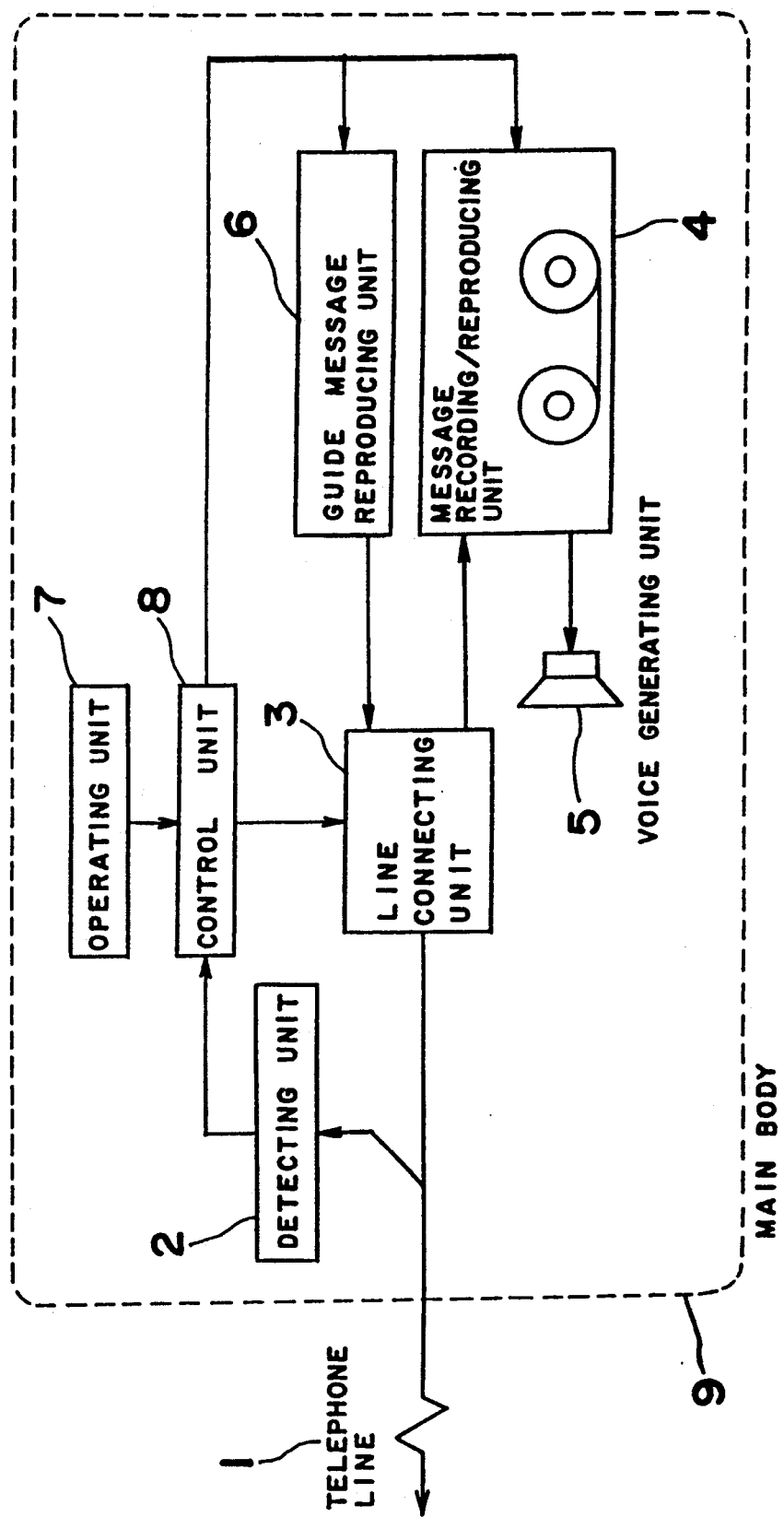
FIG. 3 is a block diagram of a conventional automatic answering system having a conventional voice message storage device for recording and reproducing a voice message.

The operation of the voice message storage device shown in FIG. 1a will be described hereinbelow in connection with the flow chart shown in FIGS. 2a and 2b. In the description herein below, the voice message storage device of the present invention is equipped in association with a called telephone. Further, a calling telephone is of a type which can send a dial signal even during the conversation period.

While in the waiting state (step S1), when the voice message storage device is called from the calling telephone, the detecting unit 2 detects the incoming call (step S2). The line connecting unit 3 is closed (step S3) and a instructional message I previously stored in the guide message reproducing unit 6 is played back. For example, the guide message I can be such that, "This is ABC company. Please first dial a number representing a section you would like to have an access to, and then, dial a number representing your command. The numbers representing the section are: 1 for section A; 2 for section B; and 3 for section C. The numbers representing your commands are: 1 for storing a message ; and 2 for hearing the stored message" (step S4).

When the person on the calling telephone dials a number representing a section A, B or C, the dialed signal is sent to the storage device of the called telephone through line 1. Thus, the dialed signal detecting unit 10 detects the dialed signal, and the detected signal representing the section is applied to and temporarily stored in control unit 8 (step S5). The temporarily stored section signal will be used later at step S11 or S19 to access a corresponding message recording/reproducing unit 4'a, 4b or 4c. According to the present embodiment, message recording/reproducing units 4a, 4b and 4c are allotted to sections A, B and C, respectively.

At step S5, however, if the section number is not inputted for a predetermined period of time, the program goes from step S5 to step S6 and further to step S14. Then, the line 1 is opened at step S14, and thereafter, the storage device is returned to the waiting state (step S1).

On the other hand, when a command number is dialed (step S7) after the input of the section number (step S5), a dial signal corresponding to the command number is sent through line 1, in the same manner as in the input of the section number, to the dialed signal detecting unit 10. The dialed signal detecting unit 10 detects the dial signal (step S9 or S15). If the command number is not inputted for a predetermined period of time, the program goes from step S7 to steps S8 and to step S14 whereby line 1 is opened again and as a result, the storage device is returned to the waiting state (step S1).

In the case where the person at the calling telephone inputs the command number 1 or 2 (step S9 or step S15), the program goes to step S10 or steps S16, respectively. If a command number other than 1 and 2 is inputted, another routine is executed at step S21. The another routine may be a program for revising the instructional message stored in the instructional message reproducing unit 6 or for initializing the message recording/reproducing units 4a, 4b and 4c, etc. The detailed description for such another routine will be omitted.

If the person at the calling telephone inputs the command number 1 for requesting the recording of a message, the program advances from step S9 to S10. A step S10, an instructional message II is given such as:

"Your message will now be recorded at the section you have just indicated. Please start your message."

Then, at step S11, one of the message recording/reproducing unit 4a, 4b and 4c identified by the temporarily stored section signal at previous step S5 is activated and connected to line connecting unit 3 through audio signal switching unit 12 for recording the message which will be given by the person at the calling telephone. Then, the message as produced by the person at the calling telephone is transmitted through line 1 and audio signal switching unit 12 to the activated message recording/reproducing unit. Then, after the lapse of a predetermined time, the program advances through step S11 and S12 to S13. Thereafter, the program goes to step S14 to open line 1, and returns to the waiting state step S1.

At step S7, if the person at the calling telephone inputs the command number 2 for requesting the hearing of the recorded message, the program goes to step S15 and further to S16. At step S16, an instructional message III previously stored in instructional message reproducing unit 6 is produced. An example of the instructional message III is given below:

"Please dial the password."

Then, the person at the calling telephone dials the password. The dialed password is transmitted through line 1 and detected by the dialed signal detecting unit 10 (step S17). Then, at step S19, the dialed password is compared with the password previously stored in control unit 8. One password is previously set for one message recording/reproducing unit. Since there are three message recording/reproducing units 4a, 4b or 4c, three different passwords are previously set. If the dialed password coincides with one of the previously stored passwords, the message recording/reproducing unit 4a, 4b or 4c corresponding to the matched password is activated to playback the stored messages (step S20).

Thereafter, the program goes to step S14. In this manner, by the matching of the password, it is possible to have access to and playback the messages stored in the message recording/reproducing unit 4a, 4b or 4c allotted to the matched password. Thereafter, the program returns to step S1.

If the dialed password is not identical to the previously set password, the program advances from step S19 to S14 so that the step for effecting the playback of the stored message (step S20) is skipped.

If no password is input after the instructional message III for a predetermined period of time, the program goes from step S17 to step S18 and further to step S14.

In the foregoing embodiment, although the voice data storage device includes three message recording/reproducing units 4a, 4b and 4c, the number can be changed to any other number, such as to two or four. Furthermore, it is possible to control the storage device such that the recording is forcibly stopped, even during the recording mode, if a silent period continues for a predetermined time, such as five seconds.

Figure 1B:
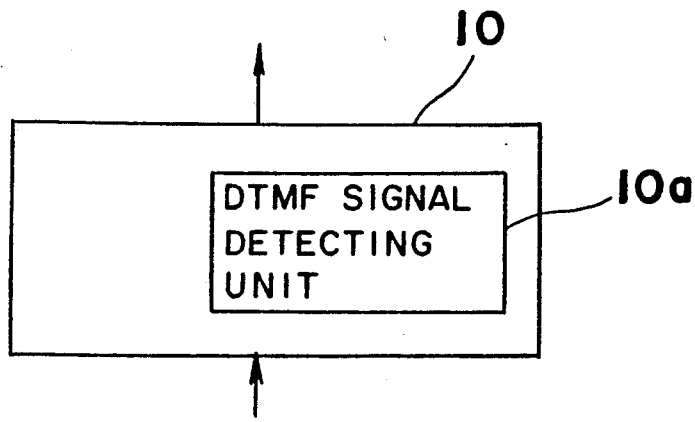

Referring to FIG. 1b, one example of the dialed signal detecting unit 10 is shown. In the case where the voice data storage device of the present invention is associated with a telephone which receives DTMF (Dual Tone Multifrequency) signals produced, for example, by push button dials, the dialed signal detecting unit 10 includes a DTMF signal detecting unit 10a, as shown in FIG. 1b.

Figure 1C:
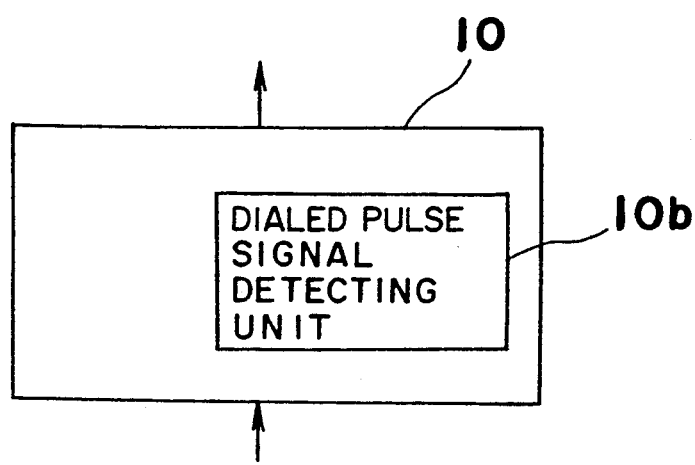

Referring to FIG. 1c, another example of the dialed signal detecting unit 10 is shown. In the case where the voice message storage device of the present invention is associated with a telephone which receives dialed pulse signals (a signal having a voltage changed in terms of pulses from a reference voltage), such as the dial signal produced by a rotary dial, the dialed signal detecting unit 10 includes a dialed pulse signal detecting unit 10b, as shown in FIG. 1c.

Figure 1D:
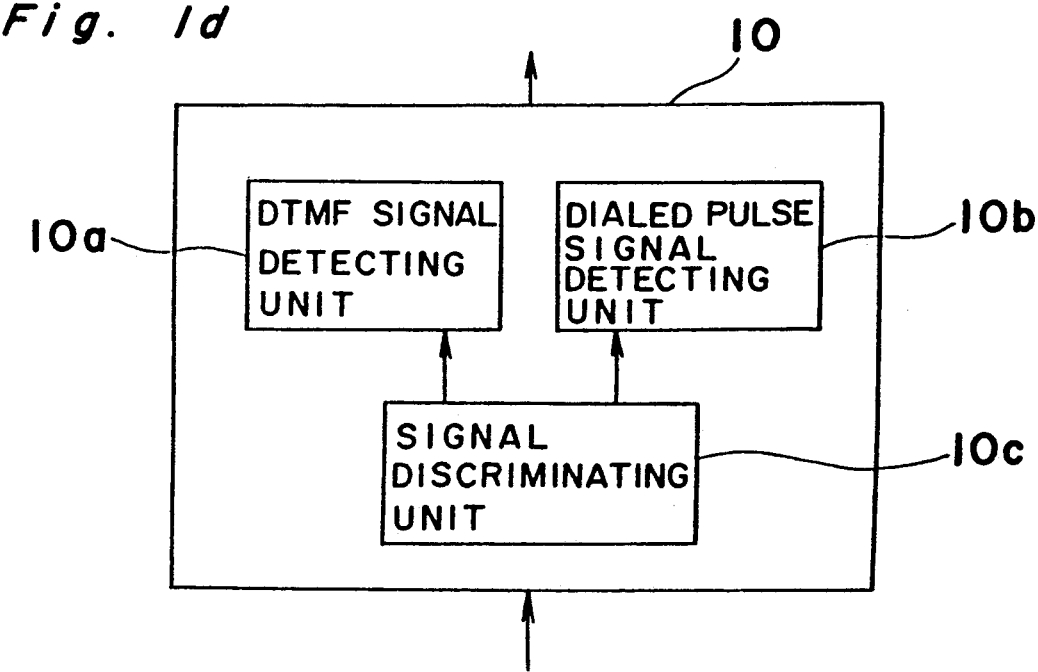

Referring to FIG. 1d, a further example of the dialed signal detecting unit 10 is shown. In the case where the voice message storage device of the present invention is associated with a telephone which receives the dialed signals either in the DTMF signal or pulse signal format, the dialed signal detecting unit 10 includes a signal discriminating unit 10c for discriminating between the DTMF signal and the pulse signal, a DTMF signal detecting unit 10a, and dialed pulse signal detecting unit 10b. When the received dialed signal is a DTMF signal, as discriminated by discriminating unit 10c, the dialed signal is applied to the DTMF signal detecting unit 10a, and when the received dialed signal is pulse signal, the dialed signal is applied to dialed pulse signal detecting unit 10b.

As is described hereinabove, the voice message storage device of the present invention facilitates efficient utilization of one telephone line for many people or many groups of people by separately providing access to individualized message storing units.

Although the present invention has been fully described by way of an example with reference to the accompanying drawings, various changes and modifications would be apparent to those skilled in the art. Therefore, unless otherwise such changes and modifications depart from the scope of the present invention, they should be construed as included therein.

What is claimed is:

1. A voice message storage device for receiving, storing and reproducing voice messages transmitted on a telephone line, said device comprising:
   a line connecting means for selectively operatively connecting to the telephone line;
   a first message recording and reproducing means, having a first analog recording tape, for recording messages received from a calling party via the telephone line onto and reproducing messages from the first analog recording tape, said first message recording and reproducing means being associated with a first identification signal;
   a second message recording and reproducing means, having a second analog recording tape, for recording messages received from a calling party via the telephone line onto and reproducing messages from the second analog recording tape, said second message recording and reproducing means being associated with a second identification signal;
   identification signal detecting means for detecting an identification signal received on the telephone line;
   control means, operatively coupled to said line connecting means and to said first and second message recording and reproducing means and to said identification signal detecting means, for operatively connecting said first message recording and reproducing means to said line connecting means when the identification signal detected by said identification signal detecting means is the first identification signal to thereby provide access to the first analog recording tape via the telephone line, and for operatively connecting said second message recording and reproducing means to said line connecting means when the identification signal detected by said identification signal detecting means is the second identification signal to thereby provide access to the second analog recording tape via the telephone line, and
   an instructional message reproducing means, operatively coupled to said control means, for reproducing prestored instructional meassages, said control means further for operatively connecting said instructional message reproducing means to said line connecting means upon detection of one of the first and second identification signals by said identification signal detecting means to thereby transmit the prestored instructional messages on the telephone line.

2. A device as recited in claim 1, further comprising an incoming call detecting means, operatively coupled to said control means, for detecting an incoming call on the telephone line.

3. A device recited in claim 1, wherein said identification signal detecting means includes a dialed signal detecting unit for detecting a dialed signal received on the telephone line, wherein the dialed signal denotes the identification signal.

4. A device as recited in claim 3, wherein said dialed signal detecting unit includes means for detecting dual tone multifrequency signals.

5. A device as recited in claim 3, wherein said dialed signal detecting unit includes means for detecting dialed signal pulses.

6. A device as recited in claim 3, wherein said dialed signal detecting unit comprises:
   a signal discriminating means for discriminating the dialed signal as being one of a dual tone multifrequency signal and a detailed pulse signal;

a dual tone multifrequency signal detecting means for detecting the dual tone multipfrequency signal; and a dialed pulse signal detecting means for detecting the dialed pulse signal.

7. A device as recited in claim 1, said control means further for associating said first and second message recording and reproducing means with first and seond passwords, respectively.

8. A device as recited in claim 7, said identification signal detecting means further for detecting a password received on the telephone line;

said control means further for operatively coupling said first message recording and reproducing means to said line connecting means and causing said first message recording and reproducing means to transmit on the telephone line a message stored on the first analog recording tape when said identification signal detecting means detects the first identification signal and the first password received on the telephone line, and further for operatively coupling the second message recording and reproducing means to the line connecting means and causing the second message recording and reproducing means to transmit on the telephone line a message recorded on the second analog recording tape when the identification signal detecting means detects the second identification signal and 9. A device as recited in claim 8, further comprising an incoming call detecting means, operatively coupled to said control means, for detecting an incoming call on the telephone line.

10. A device as recited in claim 8, wherein said identification signal detecting means includes a dialed signal detecting unit for detecting a dialed signal received on the telephone line, wherein the dialed signal denotes one of the first and second identification signals.

11. A device as recited in claim 10, wherein said dialed signal detecting unit includes means for detecting dual tone multifrequency signals.

12. A device as recited in claim 10, wherein said dialed signal detecting unit includes means for detecting dialed signal pulses.

13. A device as recited in claim 10, wherein said dialed signal detecting unit comprises:

a signal discriminating means for discriminating the dialed signal as being one of a dual tone multifrequency signal and a dialed pulse signal;

a dual tone multifrequency signal detecting means for detecting the dual tone multifrequency signal; and a dialed pulse signal detecting means for detecting the dialed pulse signal.

14. A device as recited in claim 8, wherein said identification signal detecting means includes a dialed signal detecting unit for detecting a dialed signal received on the telephone line, wherein the dialed signal denotes one of the first and second passwords.

15. A device as recited in claim 14, wherein said dialed signal detecting unit includes means for detecting dual tone multifrequency signals.

16. A device as recited in claim 14, wherein sid dialed signal detecting unit includes means for detecting dialed signal pulses.

17. A device as recited in claim 14, wherein said dialed signal detecting unit comprises:

a signal discriminating means for discriminating the dialed signal as being one of a dual tone multifrequency signal and a dialed pulse signal;

a dual tone multifrequency signal detecting means for detecting the dual tone multifrequency signal; and a dialed pulse signal detecting means for detecting the dialed pulse signal.

* * * * *